No. 712,382. Patented Oct. 28, 1902.
M. F. HUGHES.
ATTACHMENT FOR CORN HARVESTERS.
(Application filed Apr. 26, 1902.)
(No Model.) 2 Sheets—Sheet I.
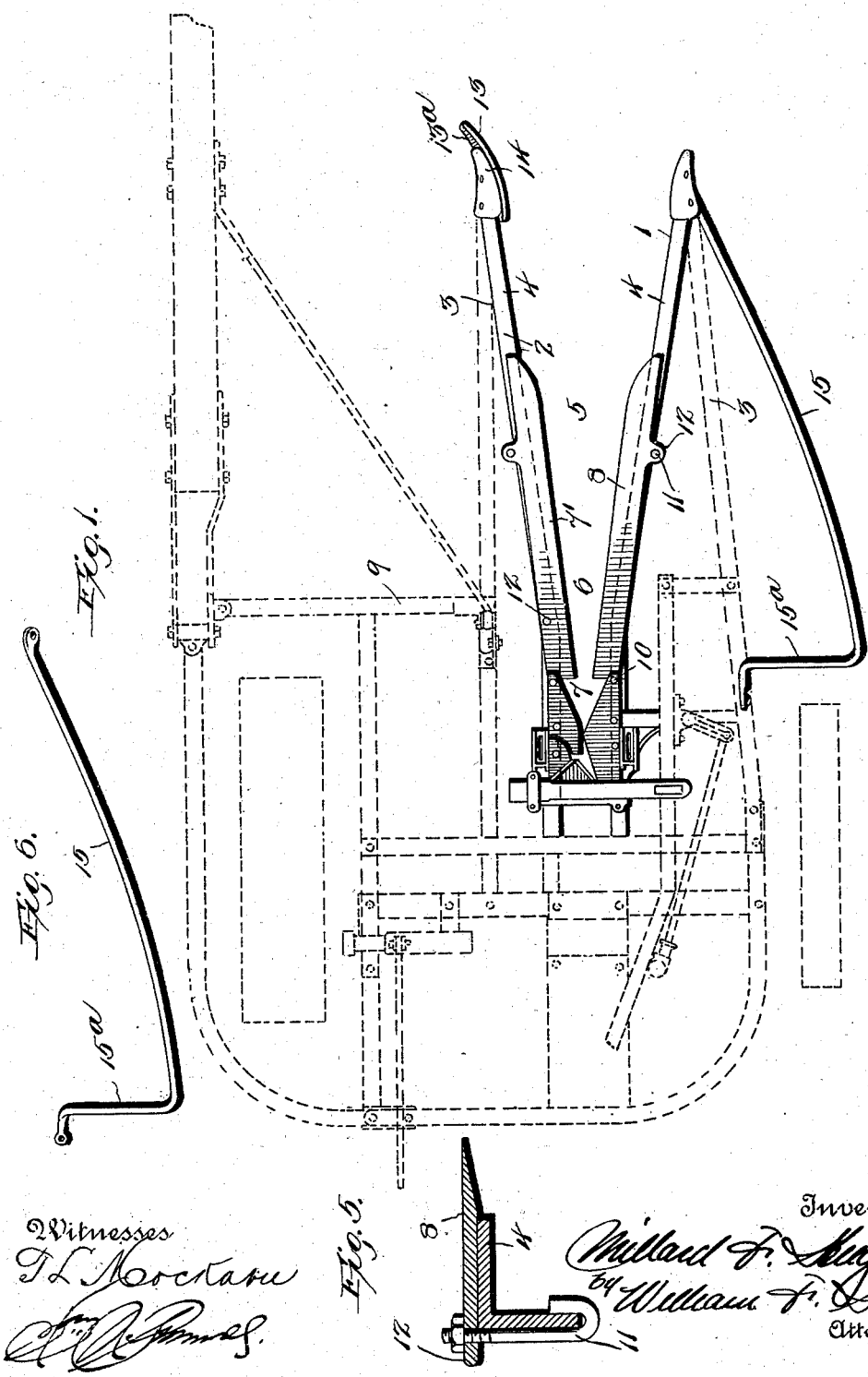

No. 712,382.
Patented Oct. 28, 1902.
M. F. HUGHES.
ATTACHMENT FOR CORN HARVESTERS.
(Application filed Apr. 26, 1902.)
(No Model.)
2 Sheets—Sheet 2.
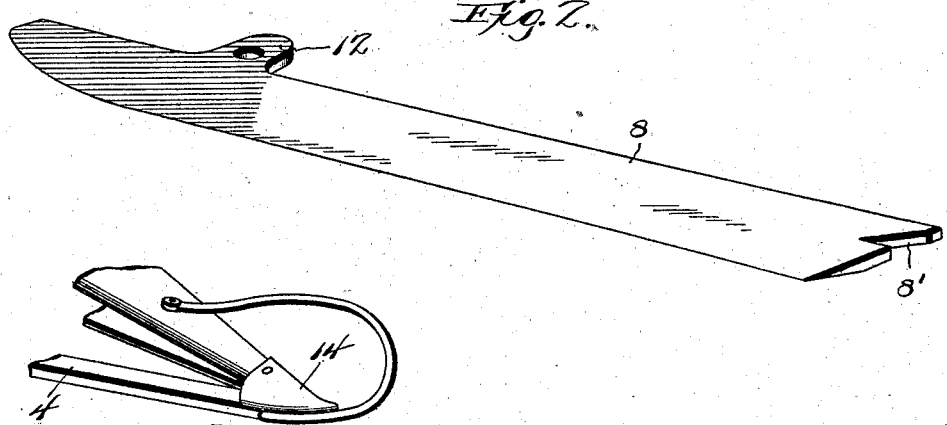
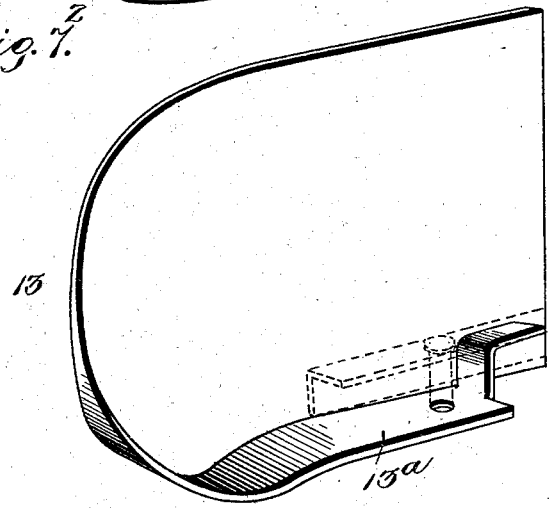
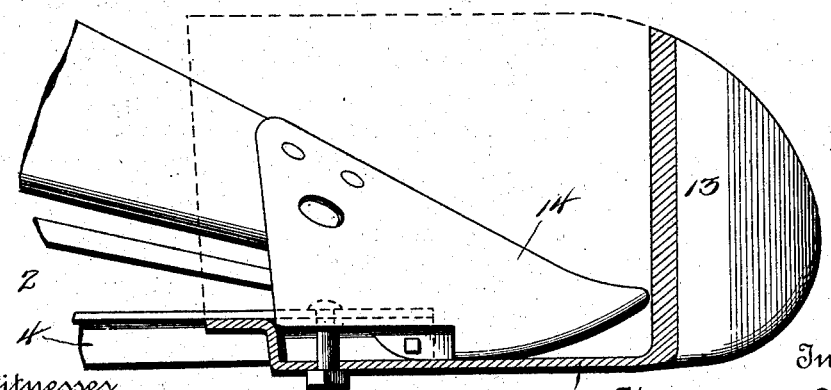
Witnesses
Inventor
Millard F. Hughes
by William F. Hall,
Attorney

UNITED STATES PATENT OFFICE.

MILLARD F. HUGHES, OF NEAR LAWRENCE, KANSAS.

ATTACHMENT FOR CORN-HARVESTERS.

SPECIFICATION forming part of Letters Patent No. 712,382, dated October 28, 1902.

Application filed April 26, 1902. Serial No. 104,837. (No model.)

*To all whom it may concern:*

Be it known that I, MILLARD F. HUGHES, a citizen of the United States, residing near Lawrence, in the county of Jefferson and State of Kansas, have invented certain new and useful Improvements in Attachments for Corn-Harvesters, of which the following is a specification, reference being had therein to the accompanying drawings.
My invention relates to corn-harvesters; and its object is to provide means to be associated with the ordinary type of harvester— such as is disclosed in Patent No. 583,937, granted June 8, 1897, to J. W. Pridmore, which is designed for harvesting corn which has been planted in regular rows—to adapt the same for harvesting corn which has been sown broadcast and which has consequently grown up irregularly and in a more or less thick mass.

To this end the invention includes certain attachments which are intended to be fitted to machines of the type mentioned to adapt the same to meet the peculiar conditions encountered in the harvesting of corn which has been sown broadcast.

Harvesters of the type referred to include gathering mechanism for the stalks, cutting mechanism, and binding mechanism. The gathering mechanism comprises two diverging forwardly-projecting prongs, forming a guiding-channel between the same, through which the stalks pass as the machine is drawn along, the cutting mechanism being located in the rear end or throat of said channel. On the end of each prong a peculiarly-shaped pointed plate is secured, which acts as a lifter to pick up such stalks as may be broken or bent over very close to the ground and straighten the same up, so that they may be severed by the cutting mechanism. The latter mechanism comprises a reciprocating knife having a shear cut and two stationary blades arranged adjacent thereto, this entire mechanism, as before premised, being located in the rear contracted part of the guiding-channel or the "throat" thereof. After the stalks are severed by the cutting mechanism they are carried to the binding mechanism; but as the present invention does not appertain to the latter it will not be further referred to.

The cutting mechanism before described is found to work very effectively when the harvester is used for the purpose for which it is intended—that is, as before described, for harvesting corn which has been planted and has grown up in regular rows; but it is entirely inadequate to meet the conditions which are encountered in harvesting corn which has been sown broadcast. For the latter purpose I have provided independent cutting-blades, which are designed to be rigidly secured to the gathering-prongs and to project into the guide-channel on opposite sides of the same in advance of the throat thereof. These knives serve to sever the outer stalks of the compact mass which passes through the channel as the machine progresses before the throat of the machine is reached thereby, and thus the main knives, located in the latter, are called upon to perform only the ordinary amount of work for which they are intended. I have also provided an attachment to be associated with the point of the left-hand gathering-prong, which is intended to prevent the ordinary lifting action thereof.

It has been found very undesirable in using the harvester for gathering corn which has been sown broadcast to pick up the stalks which may be broken or bent down close to the ground, while it is quite desirable that the prongs should gather a swath of the maximum area, and to accomplish these desiderata a shoe or plate is fitted over the ordinary gathering-points of the left-hand prong, which serves to prevent the latter from acting as a pick-up for broken or bent cornstalks and which acts as a deflector to cause the prongs to ride over such stalks without tending to raise the same. This shoe also provides an outwardly-flaring end for the prongs which serves to increase the gathering action thereof, and consequently the width of the swath covered by the machine on each trip thereof.

A further attachment is provided designed to be secured to the outside of the right-hand gathering-prong and to project therefrom to press over the cornstalks growing adjacent to the swath gathered in one trip of the harvester, so that in the succeeding trip a more compact mass will be formed in the path of the gathering-prongs, and consequently a maximum area may be covered on each trip of the machine.

The invention also includes the particular construction of the attachment before described, all of which coact and coöperate as adapters to convert an ordinary type of corn-harvesting machine into one which will efficaciously gather and cut corn which has been sown broadcast and which as a consequence has grown up irregularly and in a more or less thick mass.

The invention further includes the means for securing said attachment in place and to the other details of construction which will be hereinafter described, and particularly pointed out in the claims.

In the accompanying drawings, which illustrate the invention, I have shown the attachment associated with a machine of the Pridmore type, and to accentuate the novel features herein presented in certain of the views the old type of machine is indicated or shown in dotted lines.

In the drawings, Figure 1 is a plan view of a part of a harvesting-machine having my attachment associated therewith. Fig. 2 is a perspective view of one of the independent knives. Fig. 3 is a detail perspective view of the holding-down and gathering plate associated with the left-hand gathering-prong. Fig. 4 is an enlarged view of the left-hand prong, showing the holding-down plate associated therewith in section. Figs. 5 and 6 are detail views, and Fig. 7 is a detail view of a modification.

As herein illustrated, the gathering-prongs 1 2 are each formed of two angle-bars 3 4, the outer members of which are arranged substantially parallel with the draft of the machine, while the inner members 4 diverge outwardly and form between themselves a guide-channel 5, which is contracted near its rear end to provide a throat portion 6, in which the ordinary cutting mechanism 7 is located. As before premised, while this cutting mechanism suffices for certain classes of work it is entirely inadequate to meet the conditions which are presented in harvesting corn which has been sown broadcast, and for this purpose two independent cutting-blades 7' 8 are provided, which are designed to be readily attached to the members 4 of the gathering-prongs. Said blades are secured to said members 4 in advance of the throat 6 of the channel 5. As will be noted, the divergence of the bars 4 begins to a marked degree in advance of said throat or approximately at the point where the cross-bar 9 of the frame is secured to the left-hand prong. The blades, which extend quite a distance along each side of the channel 5, have their rear ends located approximately at this point and extend forwardly therefrom. Each blade is flat and adapted to rest upon the face of the angle-bars 4 to which it is secured and is provided with a longitudinal cutting edge extending substantially parallel to said bars and projecting into said channel, said edge being gradually curved around at the front or entering end of the knife. The blade 8 is secured to the bar 4 by providing a notch or socket 8' in the rear end thereof, into which or through which a bolt 10, designed for securing certain of the ordinary frame parts, passes. This bolt positions or holds in place the rear end of the blade, while its front end is firmly secured to the bar 4 by a hook-bolt 11, engaging the latter and having a threaded stem passing through a hole in an offset 12 from the rear longitudinal edge of the blade 8 and surmounted by an adjustable clamping-nut. It will thus be apparent that to secure this blade in place but a single bolt in addition to those ordinarily used in a corn-harvesting machine is employed. The blade 7' is secured to its carrying-bar at its front end in a similar manner to the blade 8, and near its rear end it is provided with an opening 12, extending through the body thereof, through which passes an ordinary securing-bolt which also passes through an alining opening in the frame member 4 and is surmounted by a clamping-nut.

The means to be associated with the point of the left-hand gathering-prong to nullify the ordinary lifting action thereof, as before premised, and to increase the gathering action preferably comprises a shoe or plate 13, adapted to fit upon or against the ordinary point 14 and to be secured in place by the same bolt which is employed for fastening the latter in position. This shoe is provided with an edge flange 13ª, extending around the lower and front portion thereof, which overhangs the point of the plate 14 and presents an upwardly-curved surface to the bent-over stalks which acts as a deflector to cause the prong to ride over the same without any tendency to pick up or lift said stalks. As shown in Fig. 7, this holding-down device may be constructed of a rod or bar bent into the form of the contour of the edge of the plate 13, said bar having suitable eyes formed at the ends thereof through which bolts are passed to secure the same to the end of the prong 2. As will be noted, the lower portion of this rod extends parallel with the lower portion of the point 14 and then projects in advance of the same and curves upwardly to present a deflecting surface to the bent-over or broken stalks, so that the end of the prong will be caused to ride over the same.

To adapt the machine for cutting and gathering an increased quantity of stalks on each trip of the machine or to gather a swath of maximum width, as before premised, an attachment is provided for pressing the grain adjacent to the right-hand side of the machine over as the machine progresses, so that a greater quantity of stalks will be gathered or will be in the path of the gathering-prongs on the succeeding trip of the harvester. This attachment is preferably constructed in the form of an angle-rod having a long deflecting or pressing member 15 and a rear angularly-extending attaching member 15ª. The member 15 is secured at its front end to the extreme outer end of the prong 1 and extends rearwardly and outwardly therefrom in a horizontal plane, being supported at its rear end by the member 15ª, which is bolted to the member 3 of the prong 1 in advance of the grain-wheel. It will be apparent that as the machine is drawn forward the member 15 will serve to press the grain adjacent to the right-hand side of the machine over into the path which will be traversed by the harvester on the succeeding trip thereof, and consequently the swath covered by the machine on each trip thereof will be of the maximum width.

From the foregoing it will be appreciated that I have provided certain simple and cheap attachments which may be readily applied to and removed from an ordinary type of corn-harvester by a person unskilled in mechanics and that such attachments act as adapters to convert the ordinary type of harvester, which is intended solely for gathering corn planted in regular rows, into a machine which is adapted to harvest corn which has been sown broadcast.

Having thus described the invention, what is claimed as new, and desired to be secured by Letters Patent, is—

1. The combination of a corn-harvester of the type designed to harvest corn sown in regular rows, having forwardly-extending prongs providing a guiding-channel for the growing corn, one of said prongs having a pick-up plate secured thereto and permanent cutting mechanism operating in said channel, of means for converting the same into a machine for harvesting corn sown broadcast, including a holddown device associated with said pick-up plate to prevent the lifting action thereof and removable supplemental cutting mechanism, substantially as described.

2. The combination with a corn-harvester having forwardly-extending gathering-prongs forming a guiding-channel with a throat and diverging portions in advance thereof, and permanent cutting mechanism located in said throat, of removable independent cutting attachments adapted to be associated with said machine, comprising flat blades with means for securing the same to said prongs, said blades projecting into the guiding-channel in advance of the throat portion thereof, substantially as described.

3. The combination with a corn-harvester having forwardly-extending gathering-prongs forming a guiding-channel with a throat and a diverging portion in advance thereof, and permanent cutting mechanism located in said throat, of removable independent cutting attachments adapted to be associated with said machine, said attachments comprising flat blades secured to the inner members of said prongs and extending substantially parallel with the same approximately one-half of the length thereof, substantially as described.

4. The combination with a corn-harvesting machine having gathering-prongs formed of inner and outer angle-bars, said inner bars having a guiding-channel formed between the same with a rear throat portion and cutting mechanism located in said throat portion, of independent cutting attachments comprising flat blades adapted to rest upon the faces of the inner angle-bars of the prongs, and securing-bolts having hooked ends engaging said angle-bars and threaded stems passing through said blades and surmounted by binding-nuts.

5. The combination with a corn-harvester having a frame including forwardly-extending prongs comprising inner and outer angle-bars, a cross-piece and bolts for securing the same to the inner bar of one of said prongs, of cutting attachments associated with said frame comprising flat blades, hooked bolts for securing said blades at their forward ends, and clamping-nuts surmounting said bolts, one of said blades having a notch in the rear end thereof coacting with one of the ordinary securing-bolts of the frame to retain the rear ends of said blades in position, substantially as described.

6. The combination with a corn-harvesting machine having gathering-prongs and a pick-up plate secured to the end of one of said prongs, of means adapted to be secured thereto to prevent the pick-up action of said plate, substantially as described.

7. The combination with a corn-harvesting machine having gathering-prongs and a pick-up plate secured to the end of one of said prongs, of deflecting means secured to the end of said prong for nullifying the action of said plate and to provide a flaring guide for said end, substantially as described.

8. The combination with a corn-harvesting machine having gathering-prongs and a lifting-plate secured to the end of one of said prongs, of a second plate with means for securing the same thereto, said second plate having an edge flange overhanging the first plate and providing a deflecting-surface, substantially as described.

9. The combination with a corn-harvesting machine having forwardly-extending gathering-prongs forming a guiding-channel with a throat, and a diverging portion in advance thereof, and permanent cutting mechanism located substantially in said throat; of removable cutting mechanism associated with said prongs, having cutting portions located in advance of said permanent cutting mechanism, within the diverging portion of said channel and in close proximity to the walls thereof, substantially as described.

In testimony whereof I affix my signature in presence of two witnesses.

MILLARD F. HUGHES.

Witnesses:
H. PAGE,
EDITH CHRISTENSEN.